United States Patent
Karame

(10) Patent No.: US 10,404,449 B2
(45) Date of Patent: Sep. 3, 2019

(54) METHOD FOR ENCRYPTING DATA FOR DISTRIBUTED STORAGE

(71) Applicant: NEC EUROPE LTD., Heidelberg (DE)

(72) Inventor: Ghassan Karame, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 263 days.

(21) Appl. No.: 15/503,723

(22) PCT Filed: Nov. 24, 2014

(86) PCT No.: PCT/EP2014/075425
§ 371 (c)(1),
(2) Date: Feb. 14, 2017

(87) PCT Pub. No.: WO2016/082857
PCT Pub. Date: Jun. 2, 2016

(65) Prior Publication Data
US 2018/0351731 A1     Dec. 6, 2018

(51) Int. Cl.
*H04L 9/06*     (2006.01)
*G06F 17/16*    (2006.01)

(52) U.S. Cl.
CPC .......... *H04L 9/0631* (2013.01); *H04L 9/0637* (2013.01); *G06F 17/16* (2013.01)

(58) Field of Classification Search
CPC ...... H04L 9/0631; H04L 9/0637; G06F 17/16
See application file for complete search history.

(56) References Cited

U.S. PATENT DOCUMENTS

| | | | | |
|---|---|---|---|---|
| 9,292,700 B2* | 3/2016 | Parker | ............. | G06F 21/606 |
| 10,067,719 B1* | 9/2018 | Newman | ............. | G06F 3/0659 |
| 2002/0062415 A1* | 5/2002 | Wang | ............. | G06F 13/1605 710/240 |
| 2009/0177894 A1* | 7/2009 | Orsini | ............. | G06F 21/6209 713/193 |
| 2011/0246766 A1* | 10/2011 | Orsini | ............. | G06F 11/1076 713/160 |

(Continued)

OTHER PUBLICATIONS

Canda et al., A New Mode of Using All-Or-Nothing Transforms, 2006, Tatra Mt. Math. Publ., vol. 33, 159-168 (Year: 2006).*

(Continued)

*Primary Examiner* — Saleh Najjar
*Assistant Examiner* — Louis C Teng
(74) *Attorney, Agent, or Firm* — Leydig, Voit & Mayer, Ltd.

(57) ABSTRACT

A method for encrypting data with an encryption entity includes, in a step a), dividing a plaintext into a number of N blocks. In a step b), each of the blocks are encrypted with an encryption key resulting in a number of ciphertext blocks. In a step c), a linear All-Or-Nothing scheme is applied on the ciphertext blocks. In a step d), each of the ciphertext blocks output from step c) is transformed with a transformation procedure such that the information in different ciphertext blocks is transformed differently based on the encryption key and such that the transformation procedure is only revertable with knowledge of the encryption key. In a step e), the transformed ciphertext blocks are dispersed according to an information dispersal procedure.

13 Claims, 1 Drawing Sheet

(56) References Cited

U.S. PATENT DOCUMENTS

| | | | | |
|---|---|---|---|---|
| 2012/0047339 A1* | 2/2012 | Decasper | ............ | G06F 11/1076 |
| | | | | 711/162 |
| 2012/0198241 A1* | 8/2012 | O'Hare | ............... | H04L 63/0428 |
| | | | | 713/189 |
| 2012/0250856 A1* | 10/2012 | Pasini | ................... | H04L 9/0637 |
| | | | | 380/37 |
| 2016/0087790 A1* | 3/2016 | Karame | ................ | H04L 9/0618 |
| | | | | 380/28 |
| 2016/0173276 A1* | 6/2016 | Minematsu | .............. | G09C 1/00 |
| | | | | 380/28 |

OTHER PUBLICATIONS

Stinson, Some observations on all-or-nothing transforms, Aug. 1998 (Year: 1998).*

Ma et al., Using All-or-Nothing Encryption to Enhance the Security of Searchable Encryption, 2013, IEEE (Year: 2013).*

Why are bitwise rotations used in cryptography?, Cryptography Stack Exchange, 2013 (Year: 2013).*

Ghassan O Karame et al: "Securing Cloud Data in the New Attacker Model", International Association for Cryptologic Research,, vol. 20140718:123221, Jul. 16, 2014 (Jul. 16, 2014), pp. 1-19, XP 061016652.

Kevin D Bowers et al: "HAIL: A High-Availability and Integrity Layer for Cloud Storage", International Association for Cryptologic Research,, vol. 20090420:191549, Apr. 20, 2009 (Apr. 20, 2009), pp. 1-20, XP061003119.

Daniel Slamanig et al: "On cloud storage and the cloud of clouds approach", Internet Technology and Secured Transactions, 2012 International Conference for, IEEE, Dec. 10, 2012 (Dec. 10, 2012), pp. 649-655, XP032340691.

* cited by examiner

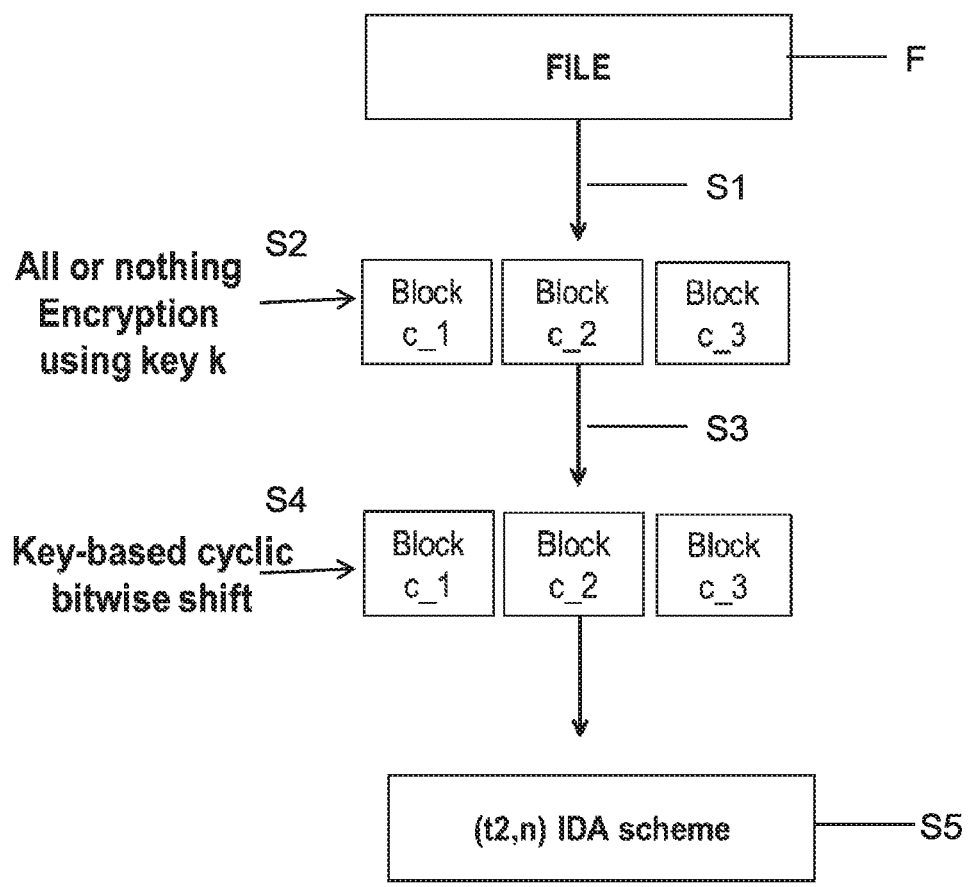

METHOD FOR ENCRYPTING DATA FOR DISTRIBUTED STORAGE

CROSS-REFERENCE TO PRIOR APPLICATION

This application is a U.S. National Phase Application under 35 U.S.C. § 371 of International Application No. PCT/EP2014/075425, filed on Nov. 24, 2014. The International Application was published in English on Jun. 2, 2016 as WO 2016/082857 A1 under PCT Article 21(2).

FIELD

The present invention relates to a method for encrypting data with an encryption entity such as a client, etc.

The present invention further relates to a system for encrypting data with an encryption entity such as a client, etc.

Although applicable to security in general the present invention will be described with regard to cloud security.

BACKGROUND

Cloud security is gaining more and more importance in many applications and services nowadays. One of the important techniques that can be used to strengthen confidentiality of data stored in the cloud is the so-called all-or-nothing encryption. All-or-nothing encryption provides semantic security of data while guaranteeing that the data can only be recovered if and only if all blocks of a ciphertext are available for download by or known to a given client. Therefore all-or-nothing encryption does not solely rely on the secrecy of the encryption key for the data: In order to acquire any meaningful information of the input plaintext it is required that any adversary has access to all the data or blocks of the ciphertext respectively. Therefore all-or-nothing encryption ensures a transparent key management process and naturally complement information dispersal techniques that can be used to efficiently store the data in a distributed storage like cloud storage.

Conventional all-or-nothing encryptions are for example disclosed in the non-patent literature of R. Rivest, "All-or-Nothing Encryption and The Package Transform", in Proceedings of Fast Software Encryption, pages 210-218, 1997 or in the non-patent literature of Anan Desai, "The Security of All-Or-Nothing Encryption: Protecting Against Exhaustive Key Search", in Proceedings of CRYPTO, 2000 or in the non-patent literature of Ghassan Karame, Claudio Soriente, Krzysztof Lichota, Srdjan Capkun, "Technical Report", available from: https://eprint.iacr.org/2014/556.pdf. Such conventional all-or-nothing encryption schemes have the following steps:

Key generation procedure: On input of a security parameter, the key generation procedure outputs an encryption key K.

Encryption procedure: On input of a plaintext p which is comprised on m blocks of size I bits each manual input of the encryption key K, the encryption procedure outputs n=m+1 blocks of ciphertext.

Decryption procedure: On input of the encryption key K and the entire ciphertext blocks a decryption procedure outputs the plaintext blocks p. If all ciphertext blocks are not available, then decryption procedure outputs NULL.

Further conventional linear transformations are for example disclosed in the non-patent literature of D. R. Stinson, "Something About all or Nothing (Transforms)", Designs, Codes and Cryptography, 2001.

One of the problems when outsourcing data of a cloud is that data confidentiality should be ensured in spite of a curious cloud. Another problem lies in the data availability in spite of a cloud server that can fail.

Conventional methods rely on the one hand on encryption to provide data confidentiality and on the other hand on information dispersal algorithms IDA to disperse the data into a plurality of n chunks such that any t servers can reconstruct the data. Such information dispersal only guarantees data availability in spite of failures but does not necessarily ensure data confidentiality. This means that the shares of the information dispersed by the information dispersal algorithm and which are held by each server still leak considerable information about the original plaintext.

To address this problem, so-called ramp schemes have been proposed. Such ramp schemes usually have two thresholds t1 and t2 out of n shares of data. The threshold t2 is the so-called standard reconstruction threshold which ensures data reconstructability from any t2 shares out of said n shares. The threshold t1 is the maximum number of shares that do not leak any information about the input or plaintext data. Thus, t1 is smaller than t2. Conventional information dispersal algorithm schemes are (0, t2, n) ramp schemes, since any share leaks information about the input data and therefore the threshold t1=0.

Conventionally, such ramp schemes are constructed, for example, by transforming specific information dispersal algorithm schemes, such as the Reed Solomon code to ramp schemes which is for example disclosed in the non-patent literature of H. Koga, S. Honjo, "A secret sharing scheme based on a systematic Reed-Solomon code and analysis of its security for a general class of sources", in IEEE Symposium on Information Theory, 2014 and of McEliece, R. J. and Sarwate, D. V., "On Sharing Secrets and Reed-Solomon Codes", Communication of the ACM September 1981.

Other conventional constructions of ramp schemes cannot be deployed or are very difficult to deploy in practice, see for example the conventional ramp schemes as disclosed in the non-patent literature of G. R. Blakley, Catherine Meadows, "Security of Ramp Schemes", Advances in Cryptology, 1985 and of Maura B. Paterson, Douglas R. Stinson, "A simple combinatorial treatment of constructions and threshold gaps of ramp schemes". Other conventional methods are disclosed in the already above-mentioned non-patent literature of H. Koga, S. Honjo, "A secret sharing scheme based on a systematic Reed-Solomon code and analysis of its security for a general class of sources", in IEEE Symposium on InformationTheory, 2014 and make or need specific assumptions about the input data.

SUMMARY

In an embodiment, the present invention provides a method for encrypting data with an encryption entity. In a step a), a plaintext is divided into a number of N blocks. In a step b), each of the blocks are encrypted with an encryption key resulting in a number of ciphertext blocks. In a step c), a linear All-Or-Nothing scheme is applied on the ciphertext blocks. In a step d), each of the ciphertext blocks output from step c) is transformed with a transformation procedure such that the information in different ciphertext blocks is transformed differently based on the encryption key and such that the transformation procedure is only revertable with knowledge of the encryption key. In a step e), the transformed ciphertext blocks are dispersed according to an information dispersal procedure.

BRIEF DESCRIPTION OF THE DRAWING

The present invention will be described in even greater detail below based on the exemplary FIGURE. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

The single FIGURE shows a part of a method according to a first embodiment of the present invention.

DETAILED DESCRIPTION

In an embodiment, the present invention provides a method and a system for encrypting data with an encryption entity enabling a more secure ramp scheme.

An embodiment of the present invention further provides a method and a system for encrypting data with an encrypting entity which keep the confidentiality properties of a ramp scheme, even if encryption information like an encryption key is leaked to an adversary.

An embodiment of the present invention even further provides a method and a system for encrypting data with an encryption entity like a client enabling an efficient performance.

According to an embodiment, a method for encrypting data with an encryption entity such as a client, etc. includes the steps of:
a) Dividing a plaintext into a number of N blocks,
b) Encrypting each block with an encryption key resulting in a number of ciphertext blocks,
c) Applying a linear All-Or-Nothing scheme on said ciphertext blocks,
d) Transforming each outputted ciphertext block of step c) with a transformation procedure such that the information in different ciphertext blocks is transformed differently based on said encryption key and such that the transformation procedure is only revertable with knowledge of said encryption key, and
e) Dispersing the transformed ciphertext blocks according to an information dispersal procedure.

According to an embodiment, a system for encrypting data with an encryption entity such as a client, etc. includes one or more encryption entities such as clients, adapted to or adapted to cooperate with each other to perform the steps of:
a) Dividing a plaintext into a number of N blocks,
b) Encrypting each block with an encryption key resulting in a number of ciphertext blocks,
c) Applying a linear All-Or-Nothing scheme on said ciphertext blocks,
d) Transforming each outputted ciphertext block of step c) with a transformation procedure such that the information in different ciphertext blocks is transformed differently based on said encryption key and such that the transformation procedure is only revertable with knowledge of said encryption key, and
e) Dispersing the transformed ciphertext blocks according to an information dispersal procedure.

According to an embodiment of the invention, it has been recognized that a secure ramp scheme which can use any information dispersal algorithm scheme is provided.

According to an embodiment of the invention, it has been further recognized that only a small performance "penalty" compared with a conventional ramp scheme is present although security is enhanced.

According to an embodiment of the invention, it has been even further recognized that the ramp scheme functionality is preserved even with the encryption key is leaked to an adversary.

According to an embodiment of the invention, it has been even further recognized that the present invention provides a secure way to ensure file access revocation even if the owner has been revoked access and still retains access to the encryption key and to parts of the ciphertext blocks. In this case, an embodiment of the present invention ensures that the revoked user cannot acquire any meaningful bit of information about the original file.

According to an embodiment of the invention, it has been further recognized that linear transforms or schemes are much faster than an encryption round for instance.

According to an embodiment of the invention, it has been even further recognized that a linear all-or-nothing transformation when compassed with an information dispersal algorithm is not secure. Since an information dispersal algorithm might entail linear operations then a linear all-or-nothing transform together with an information dispersal algorithm might still partially leak information about the input plaintext.

In other words, an embodiment of the present invention comprises the steps of encrypt the data into n ciphertext blocks using an encryption key K, then apply an all-or-nothing scheme on the encrypted data, use a function based on key K to transform the bits of each ciphertext block in such a way that the function cannot be reverted without knowledge of the encryption key K in such that bits in different blocks are transformed independently at least in the computational sense. Finally, any (t2, n) information dispersal algorithm scheme is applied resulting in a (t2, t2, n) ramp scheme keeping the ramp scheme properties even if the encryption key K is given or leaked to an adversary.

According to a preferred embodiment, the linear all-or-nothing scheme is performed by applying a matrix multiplication with a matrix, wherein the matrix elements on the diagonal are 0 and all other matrix elements are 1. This enables to provide a linear all-or-nothing transformation scheme in an easy and efficient way.

According to a further preferred embodiment, the matrix multiplication is performed by XOR- and AND-operations. This enables an efficient computation of the multiplication and addition operations of the matrix-multiplication.

According to a further preferred embodiment, the transformation procedure performs a keyed bit permutation per ciphertext block using the index of the corresponding ciphertext block as additional random information. This enables an efficient transformation in particular in terms of security and performance.

According to a further preferred embodiment, the transformation procedure performs a keyed block cipher encryption per ciphertext block using the index of the corresponding ciphertext block as additional random information. This provides an alternative transformation procedure which can also be efficiently performed.

According to a further preferred embodiment, the transformation procedure performs a cyclic bitwise operation, preferably per ciphertext block. This enables that bitwise shifting can be executed in small clock cycles and is as such a fast operation.

According to a further preferred embodiment, the cyclic bitwise shifting per ciphertext block is performed using a trapdoor function with input of the encryption key and index of the respective ciphertext block, preferably by using the trapdoor function modulo the size of the corresponding ciphertext block. This enables in an easy and efficient way to provide a cyclic bitwise shifting.

According to a further preferred embodiment, the cyclic bitwise shifting is performed on all ciphertext blocks simultaneously using a function, preferably a one way cryptographic function, with input of the encryption key and modulo the size of all ciphertext blocks. This allows an even faster execution of the transformation procedure and enhances the security.

The only FIGURE shows a part of a method according to a first embodiment of the present invention.

In the following a multi-cloud storage system is considered which can leverage a number of commodity cloud providers with the goal of distributing trust across administrative domains. This model is receiving attention nowadays with leading cloud-service providers offering products for multi-cloud systems. For instance in the following a system of a number of s storage servers is considered and a collection of users. Each server appropriately authenticates users.

In the FIGURE, a file F should be encrypted. Based on an embodiment of the invention it is assumed that an encryption procedure exists such that on an input of a plaintext bitstream p, a random seed S this encryption procedure divides the file F into blocks p1, ... , pN, where N is odd such that each block has size I. Here it is assumed that I is the block size of the particular block cipher used. The set of input blocks is then encrypted under key K resulting in a ciphertext $\underline{c}=\{S, \underline{c1}, \ldots \underline{cN}\}$. Further it is assumed that $S=\underline{c0}$.

Then, a linear transformation to c is applied. More specifically, M is assumed to be an (N+1)-by-(N+1) matrix where a matrix element $M_{\{i,j\}}=0$ if i=j and $m_{\{i,j\}}=1$, otherwise.

Then $c=\underline{c}.M$, is computed where addition and multiplication are implemented by means of XOR and AND operations, respectively. This transform can be efficiently computed in 2(N+1) XOR operations by calculating:
t=c0 XOR ... XOR cN
$\underline{ci}$=t XOR ci Given the encryption key K, inverting the resulting ciphertext c entails computing $\bar{c}=c.M^{-1}$ and decrypting $\underline{c}$. M is invertible with $M=M^{-1}$.

Before applying a (t2,n) IDA scheme such as Reed Solomon coding in each block $\underline{ci}$, a cyclic bitwise operation per block is used by an amount of f(K,i) mod $|\underline{ci}|$, where f(.) is a trapdoor function. The bitwise shift can be executed in small clock cycles on a computer and is as such considered a fast operation. Alternatively, a faster approach is to shift the bits of all the blocks using f(K) modulo the size of all the output blocks of $\underline{ci}$. f could be a hash function. Optionally a block permutation can be additionally performed after the bitwise shifting enhancing the security.

Then a (t2,n) IDA procedure is applied over the output blocks. The result is a (t2-2, t2, n) ramp scheme in this particular embodiment.

Besides being a secure ramp scheme, the technique also can act as a secure way to ensure file access revocation even if the owner has been revoked access but still retains access to the key and to parts of the ciphertext blocks (less than half of the entire file). Indeed, in this case, the technique ensures that the revoked user cannot acquire any meaningful bit of information about the original file.

Besides a keyed cyclic bitwise shifting, for example a keyed bit permutation using the block index as an additional seat or a keyed block cipher encryption per block using the block index S an additional seat can be used.

For encrypting the file F in a first step S1 the file F is divided into a number of chunks. Then in a second step S2 an all-or-nothing encryption using the encryption key k is applied on the divided blocks resulting in n ciphertext blocks $\underline{c1}, \underline{c2}, \ldots$ In a third step S3 a linear all-or-nothing scheme is applied on the n ciphertext blocks $\underline{c1}, \underline{c2}, \ldots$ In a fourth step S4 a key-based cyclic bitwise shift to transform the bits of each ciphertext block $\underline{c1}, \underline{c2}, \ldots$ is performed in such a way that this shift cannot be reverted without the knowledge of the encryption key K in such that the bits in different ciphertext blocks $\underline{c1}, \underline{c2}, \ldots$ are transformed independently at least in a computational sense.

In a fifth step S5 any (t2, n) information dispersal algorithm scheme is applied.

In summary, an embodiment of the present invention enables the construction of a secure ramp scheme using any (t2, n) information dispersal algorithm IDA scheme with only small performance penalty. An embodiment of the present invention preserves the ramp scheme functionality even if the encryption key is leaked to an adversary.

According to an embodiment, the present invention preferably provides a method for encrypting data comprising the steps of:

1) Encrypt the data into n ciphertext blocks using a key K.
2) Apply a linear all or nothing scheme on the data.
3) Use a function based on key K to transform the bits of each ciphertext block in such a way that the function cannot be reverted without knowledge of K, and such that the bits in different blocks are transformed independently (at least in the computational sense).
4) Apply any (t2, n) IDA scheme.

An embodiment of the present invention provides in particular embedding of a keyed-based trapdoor transformation of bits of the output of an all-or-nothing encryption in such a way that bits in different blocks are transformed independently. Even further an embodiment of the present invention provides a construction of a secure ramp scheme based on any (t2, n) information dispersal algorithm IDA scheme keeping the ramp scheme confidentiality properties even if the encryption key is leaked to an adversary.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for encrypting data with an encryption entity, the method comprising:
    a) Dividing a plaintext into a number of N blocks,
    b) Encrypting each of the blocks with an encryption key resulting in a number of ciphertext blocks,
    c) Applying a linear All-Or-Nothing scheme on the ciphertext blocks by applying a matrix multiplication with a matrix, wherein matrix elements on a diagonal of the matrix are zero and all other matrix elements are one,
    d) Transforming each of the ciphertext blocks output from step c) with a transformation procedure such that the information in different ciphertext blocks is transformed differently based on the encryption key and such that the transformation procedure is only revertable with knowledge of the encryption key, and
    e) Dispersing the transformed ciphertext blocks according to an information dispersal procedure.

2. The method according to claim 1, wherein the transformation procedure performs a cyclic bitwise operation.

3. The method according to claim 1, wherein the matrix multiplication is performed by XOR- and AND-operations.

4. The method according to claim 1, wherein the transformation procedure performs a keyed bit permutation per block using a respective index of each ciphertext block as additional random information.

5. The method according to claim 1, wherein the transformation procedure performs a keyed block cipher encryption per ciphertext block using a respective index of each ciphertext block as additional random information.

6. The method according to claim 2, wherein a cyclic bitwise shifting per ciphertext block is performed using a trapdoor function with input of the encryption key and an index of the respective ciphertext block.

7. The method according to claim 6, wherein the cyclic bitwise shifting is performed using the trapdoor function modulo the size of the respective ciphertext block.

8. The method according to claim 2, wherein a cyclic bitwise shifting is performed on all the ciphertext blocks simultaneously using a function with input of the encryption key and modulo the size of all the ciphertext blocks.

9. The method according to claim 8, wherein the function is a one-way cryptographic function.

10. The method according to claim 2, wherein the ciphertext blocks are permuted after the cyclic bitwise operation.

11. A system for encrypting data with an encryption entity, the system comprising one or more encryption entities including memory and one or more computer processors, which individually or in cooperation with each other, are configured to perform the following steps:
    a) Dividing a plaintext into a number of N blocks,
    b) Encrypting each of the blocks with an encryption key resulting in a number of ciphertext blocks,
    c) Applying a linear All-Or-Nothing scheme on the ciphertext blocks by applying a matrix multiplication with a matrix, wherein matrix elements on a diagonal of the matrix are zero and all other matrix elements are one,
    d) Transforming each of the ciphertext blocks output from step c) with a transformation procedure such that the information in different ciphertext blocks is transformed differently based on the encryption key and such that the transformation procedure is only revertable with knowledge of the encryption key, and
    e) Dispersing the transformed ciphertext blocks according to an information dispersal procedure.

12. The system according to claim 11, wherein the one or more encryption entities are clients.

13. A method for encrypting data with an encryption entity, the method comprising:
    a) Dividing a plaintext into a number of N blocks,
    b) Encrypting each of the blocks with an encryption key resulting in a number of ciphertext blocks,
    c) Applying a linear All-Or-Nothing scheme on the ciphertext blocks by applying a matrix multiplication with a matrix, wherein matrix elements on a diagonal of the matrix are zero and all other matrix elements are one,
    d) Transforming each of the ciphertext blocks output from step c) with a transformation procedure, which performs a keyed bit permutation per block using a respective index of each ciphertext block as additional random information or performs a keyed block cipher encryption per ciphertext block using the respective index of each ciphertext block as the additional random information, such that the information in different ciphertext blocks is transformed differently based on the encryption key and such that the transformation procedure is only revertable with knowledge of the encryption key, and
    e) Dispersing the transformed ciphertext blocks according to an information dispersal procedure.

* * * * *